United States Patent [19]

Jamieson

[11] Patent Number: 5,502,592
[45] Date of Patent: Mar. 26, 1996

[54] WIDE-APERTURE INFRARED LENSES WITH HYPER-HEMISPHERICAL FIELDS OF VIEW

[75] Inventor: Thomas H. Jamieson, Sunnyvale, Calif.

[73] Assignee: Lockheed Missiles & Space Company, Inc., Sunnyvale, Calif.

[21] Appl. No.: 155,254

[22] Filed: Nov. 22, 1993

[51] Int. Cl.⁶ ............................ G02B 13/14; G02B 13/06; G02B 9/62
[52] U.S. Cl. ........................ 359/355; 359/356; 359/762; 359/725
[58] Field of Search ...................... 359/355, 356, 359/357, 746, 747, 748, 781, 783, 770, 725, 762

[56] References Cited

U.S. PATENT DOCUMENTS

| | | | |
|---|---|---|---|
| 3,700,312 | 10/1972 | Bertele | 359/762 |
| 3,741,630 | 1/1973 | Nakagawa | 359/762 |

*Primary Examiner*—Martin Lerner
*Assistant Examiner*—Audrey Y. Chang
*Attorney, Agent, or Firm*—John J. Morrissey; Robert P. Sabath; Edward J. Radlo

[57] ABSTRACT

Design forms are disclosed for infrared imaging systems that can operate at hyper-hemispherical fields of view (e.g., up to 270°) and at wide relative apertures (e.g., up to f/0.7) to produce images having low distortion—typically no more than 20% greater than the distortion resulting when the image size is proportional to the field angle.

6 Claims, 15 Drawing Sheets

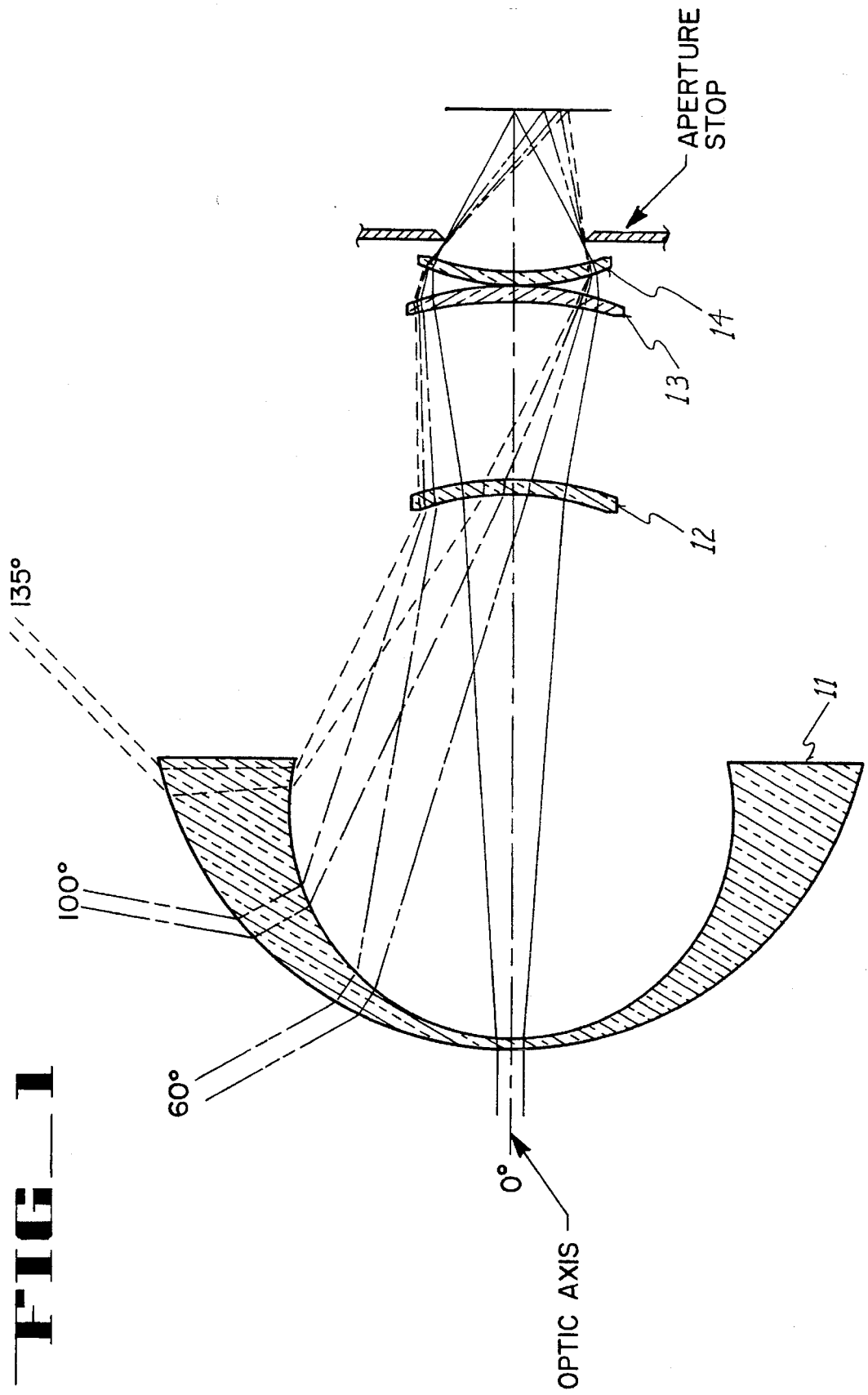
FIG_1

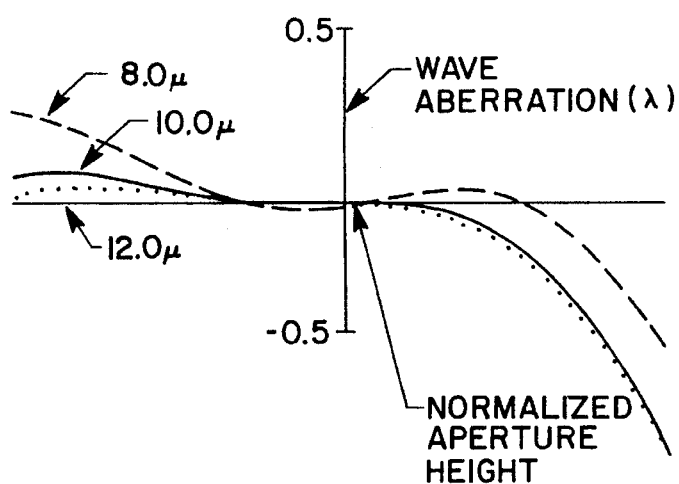
FIG_2A
SEMI-FIELD ANGLE: 135°
TANGENTIAL
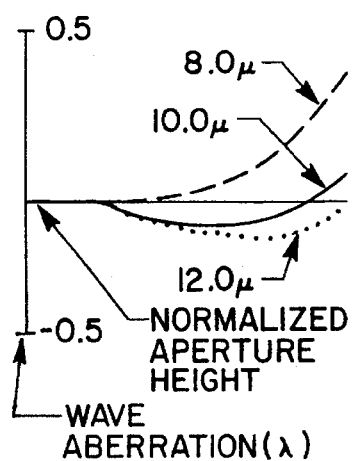
FIG_2B
SEMI-FIELD ANGLE: 135°
SAGITTAL
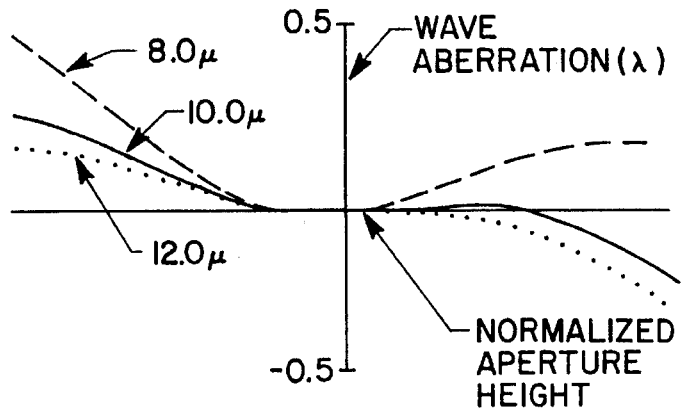
FIG_3A
SEMI-FIELD ANGLE: 100°
TANGENTIAL
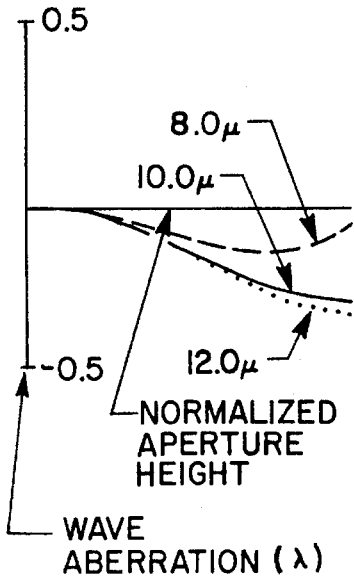
FIG_3B
SEMI-FIELD ANGLE: 100°
SAGITTAL

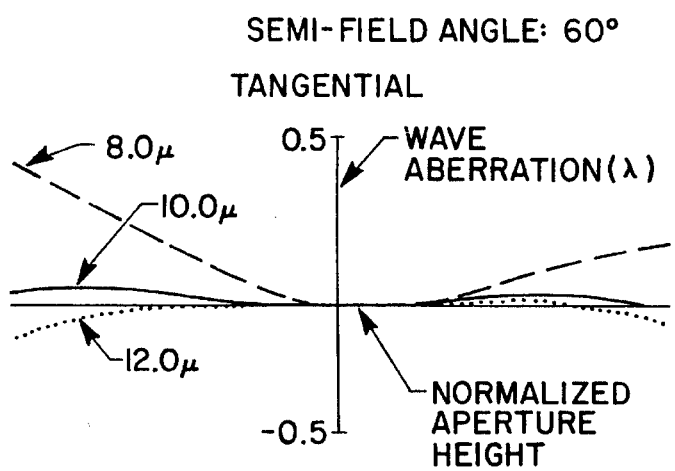
FIG_4A
SEMI-FIELD ANGLE: 60°
TANGENTIAL
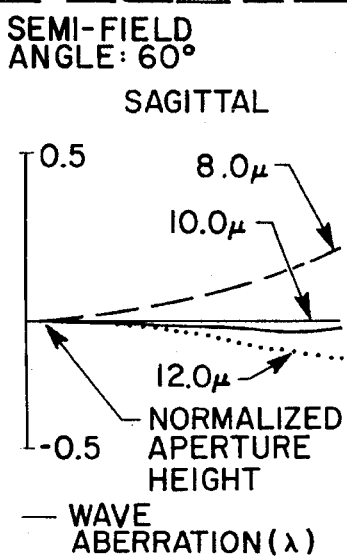
FIG_4B
SEMI-FIELD ANGLE: 60°
SAGITTAL
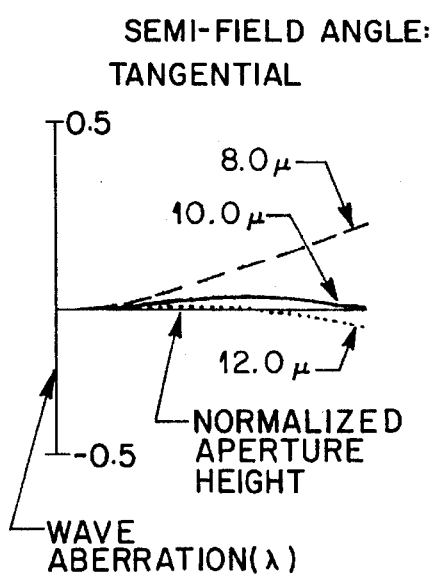
FIG_5A
SEMI-FIELD ANGLE: 0°
TANGENTIAL
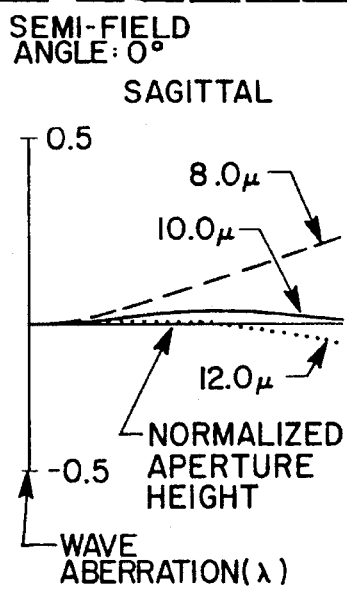
FIG_5B
SEMI-FIELD ANGLE: 0°
SAGITTAL

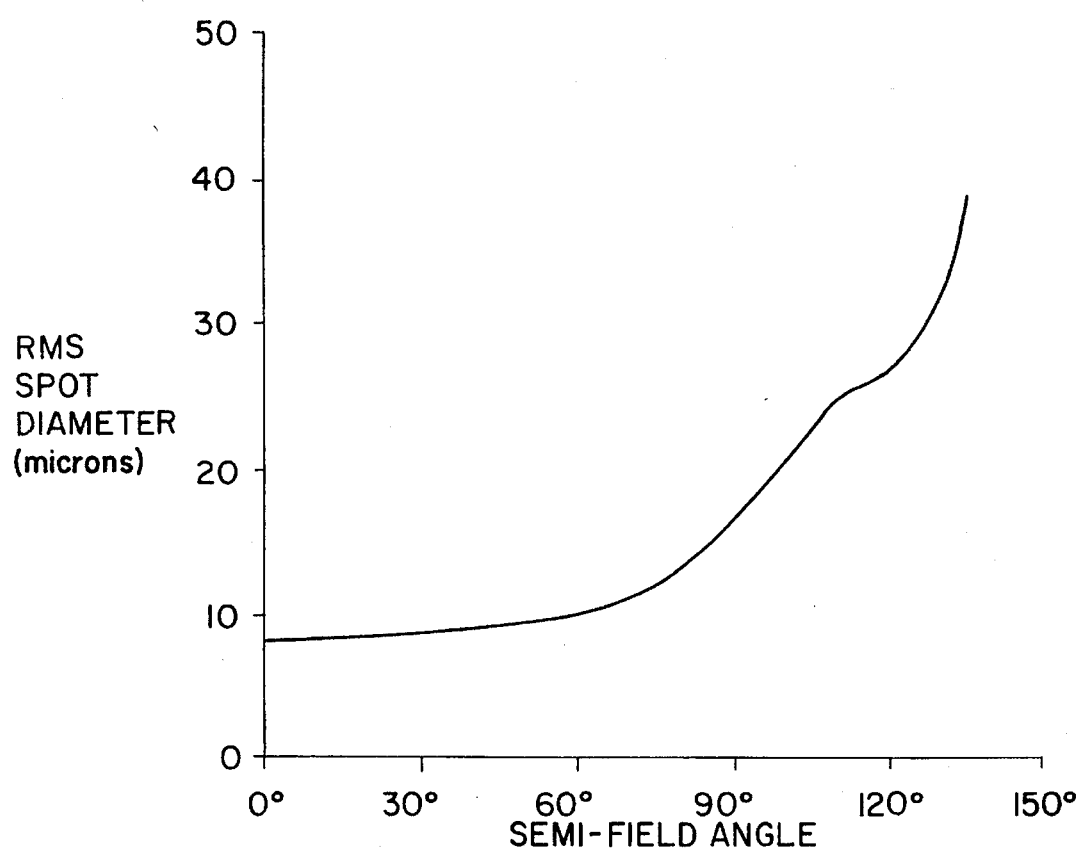
FIG_6

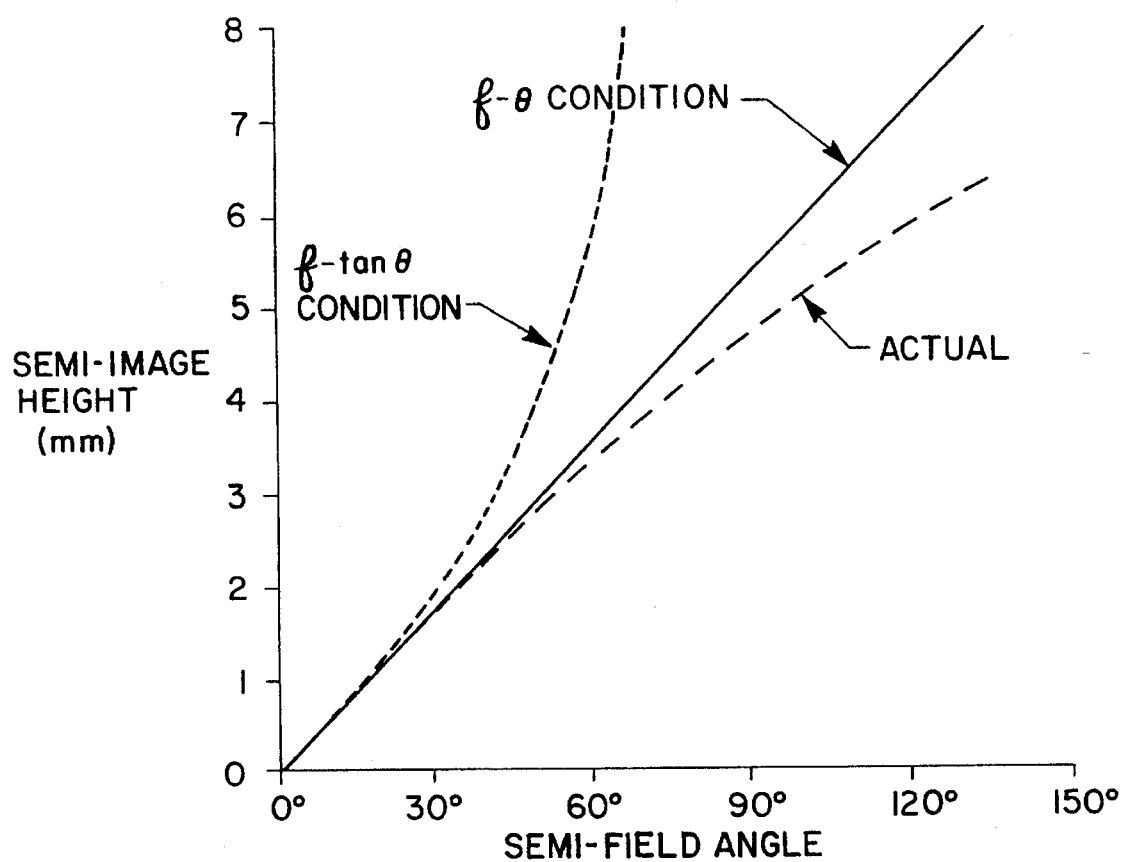
FIG_7

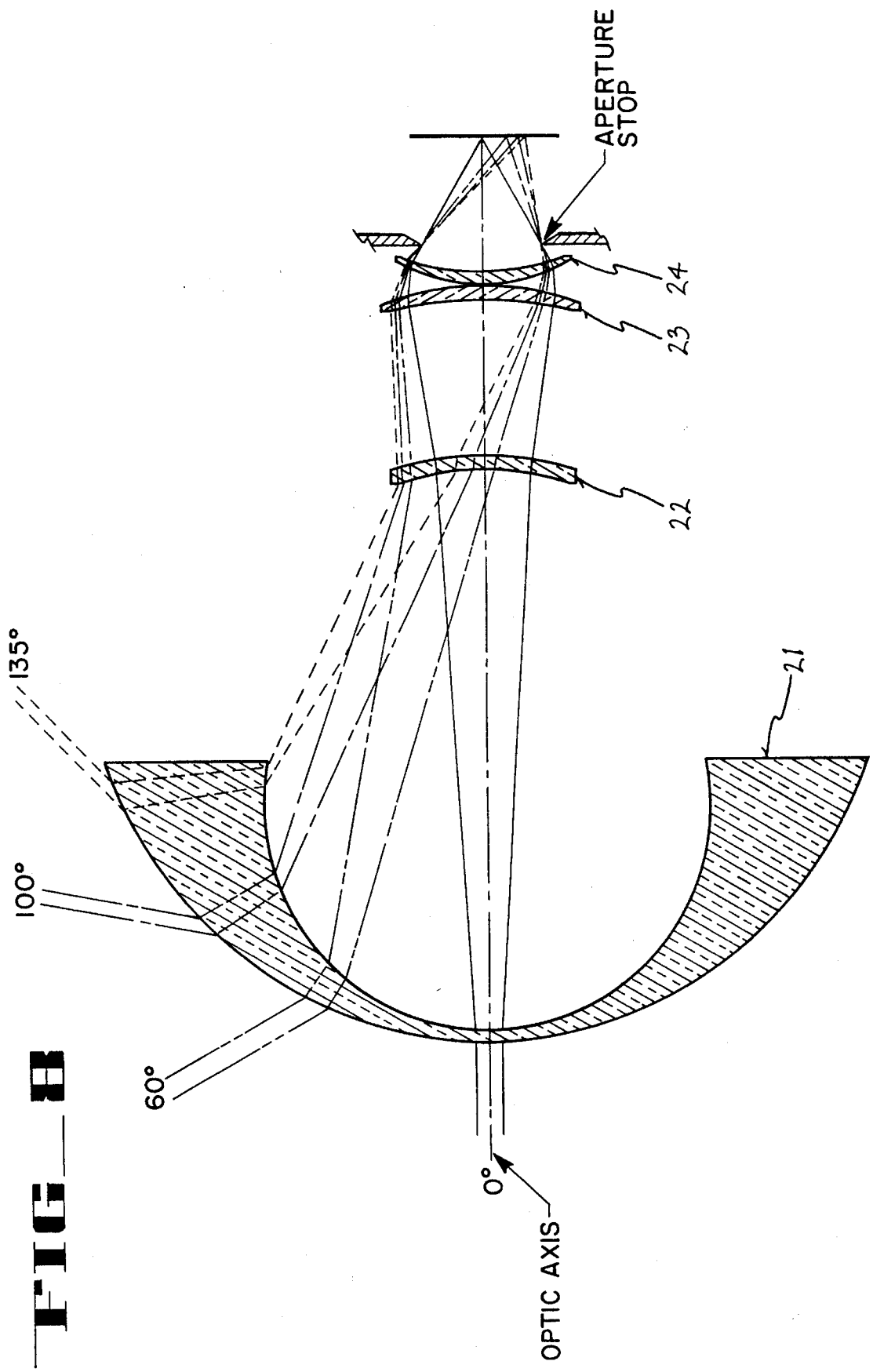

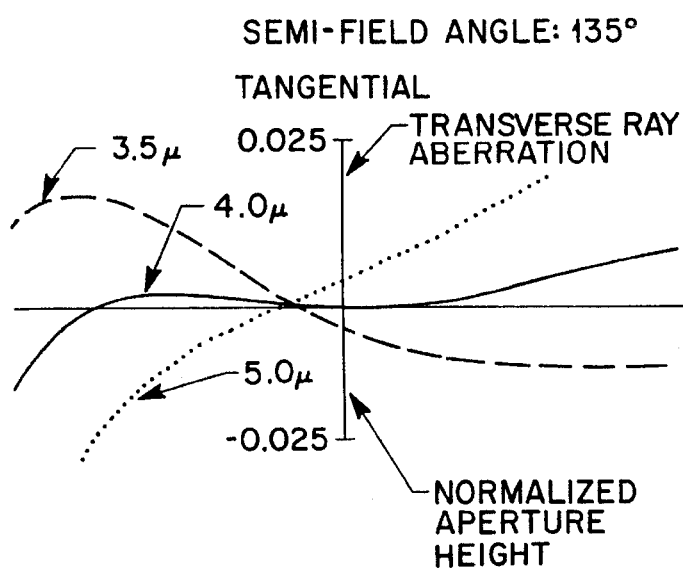
FIG_9A
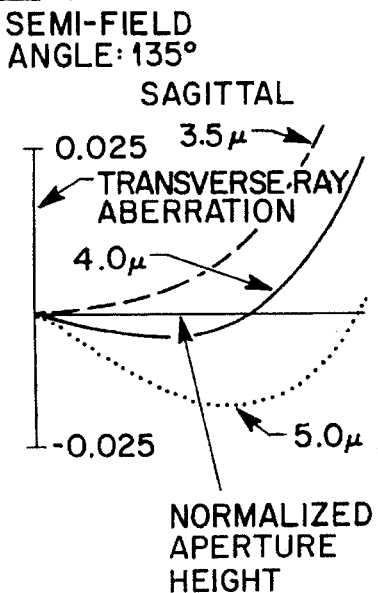
FIG_9B
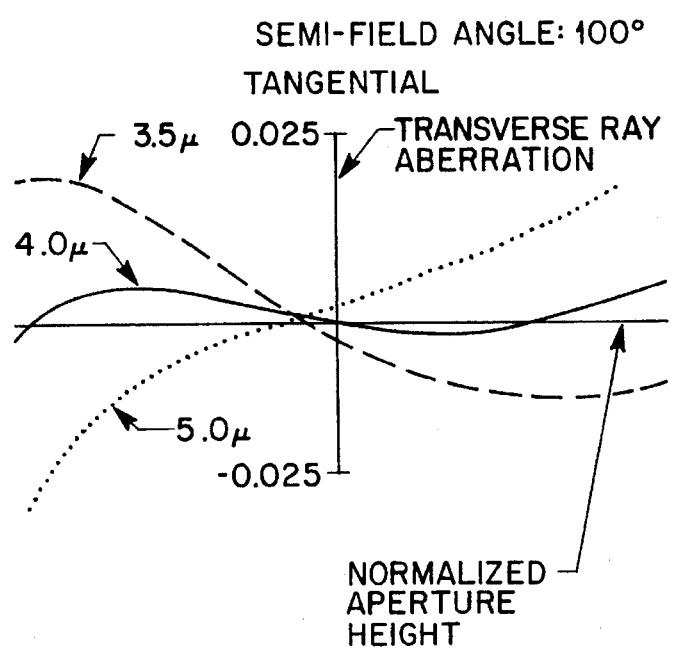
FIG_10A
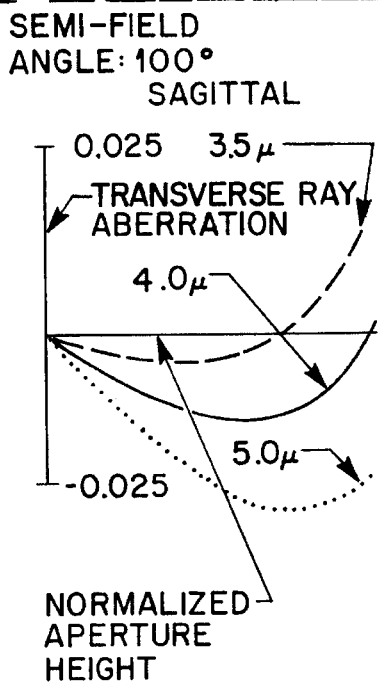
FIG_10B

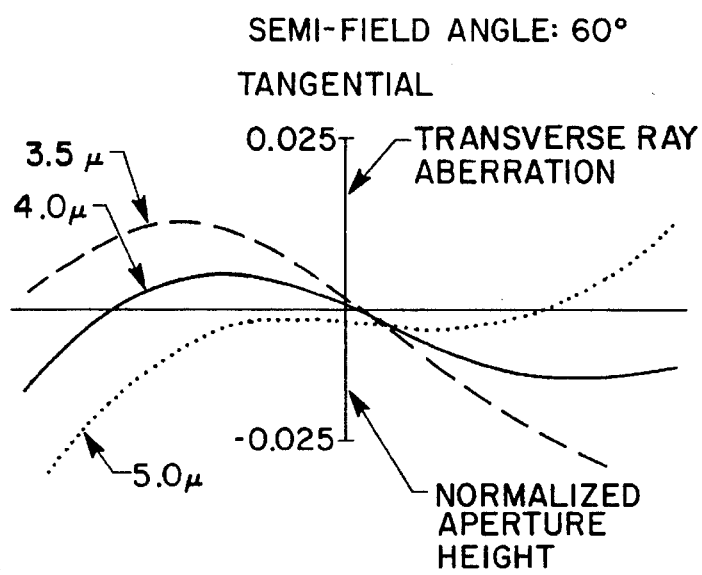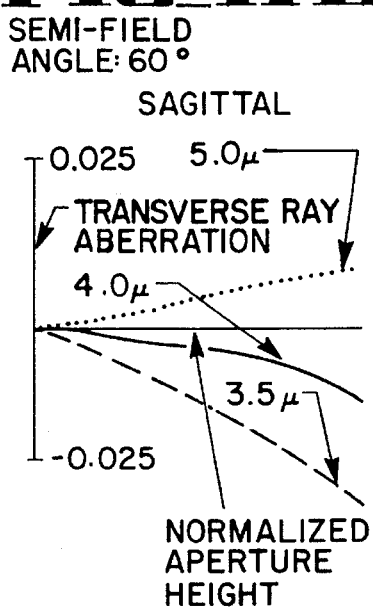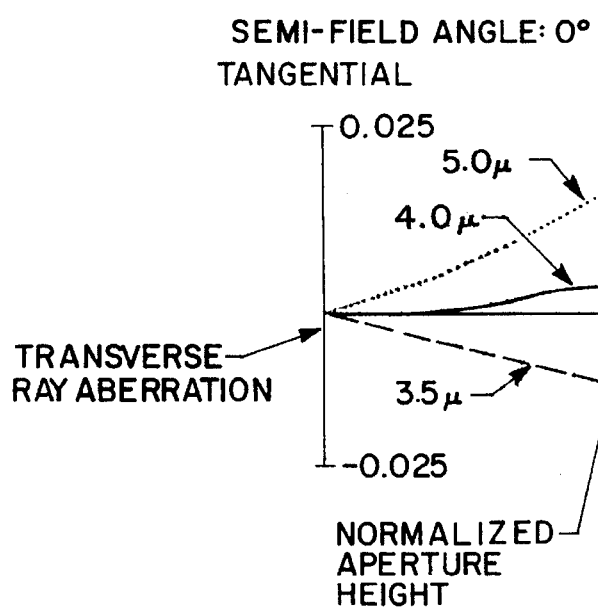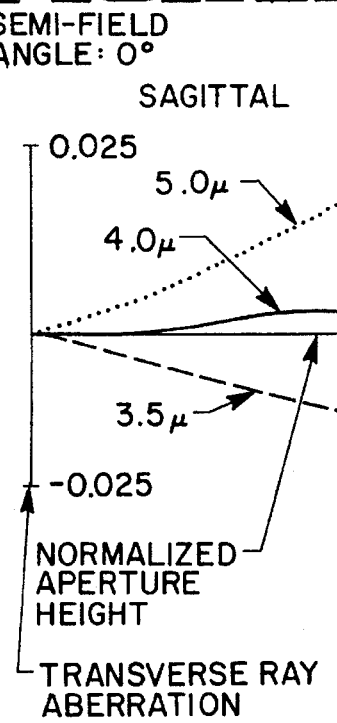

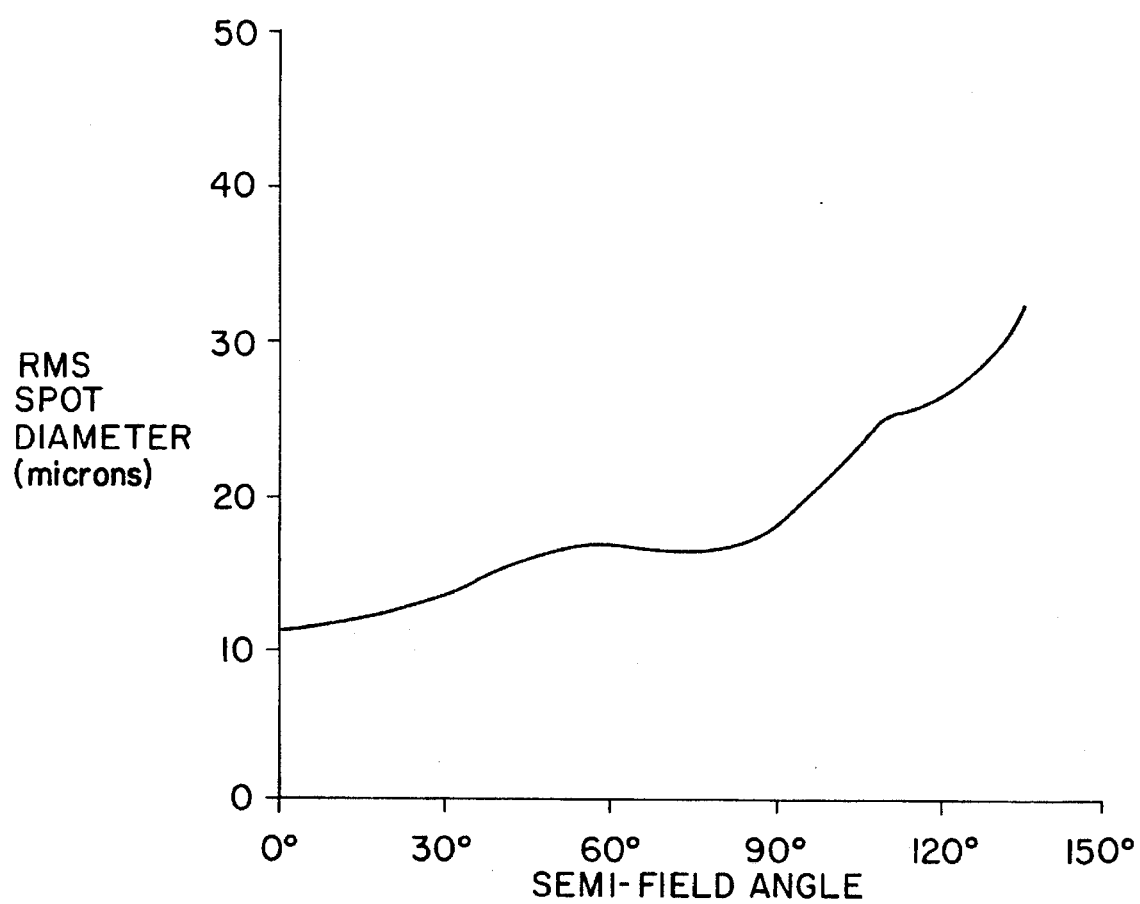
FIG_13

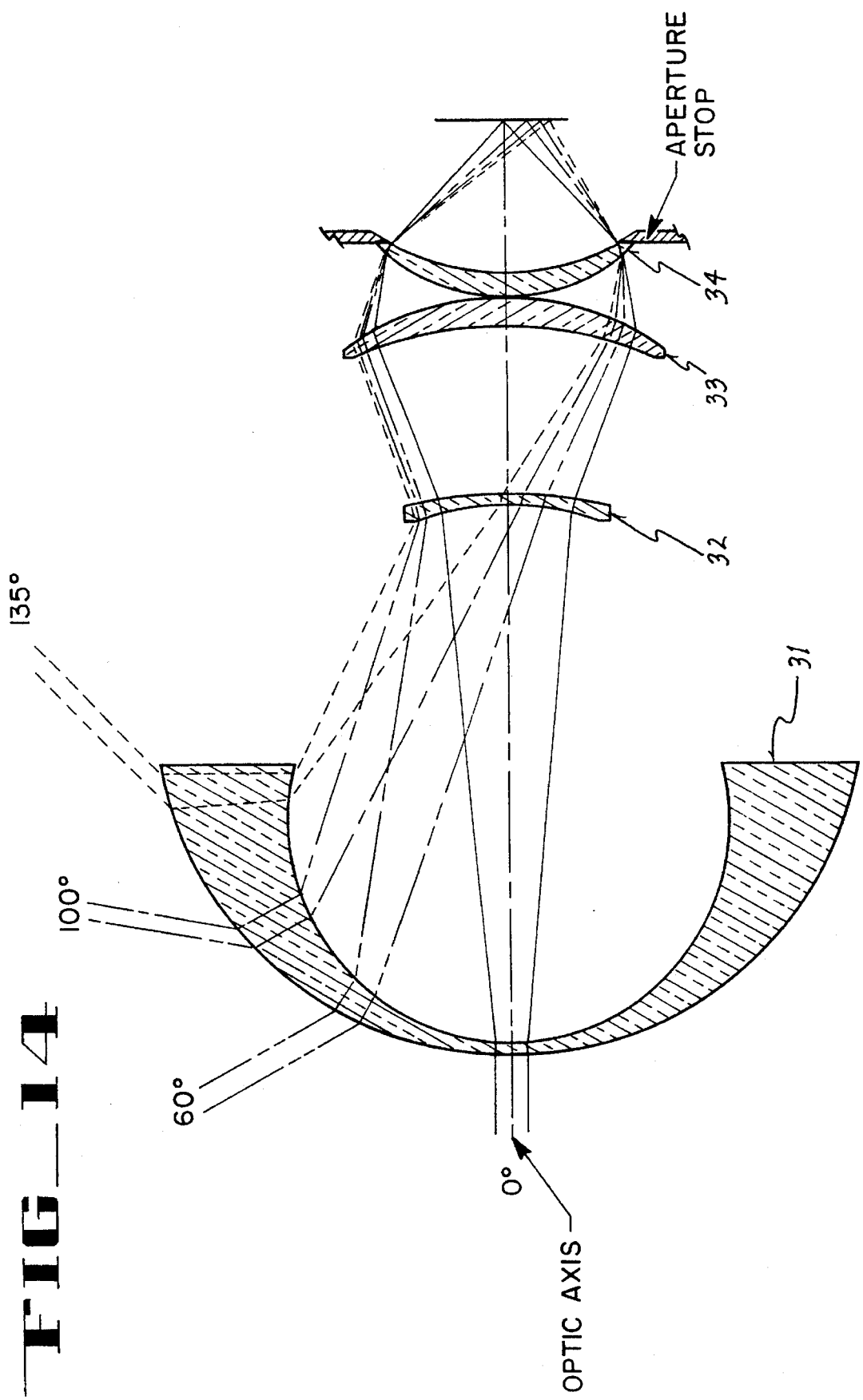

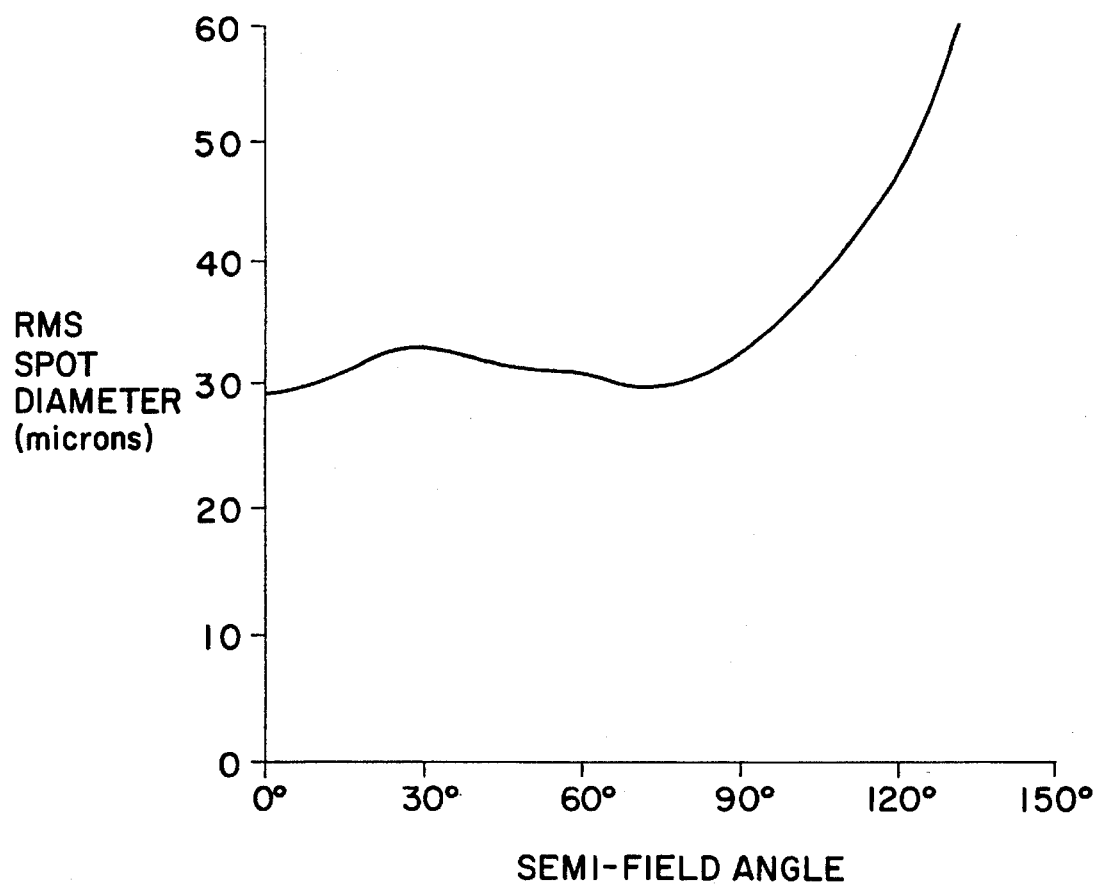
FIG_15

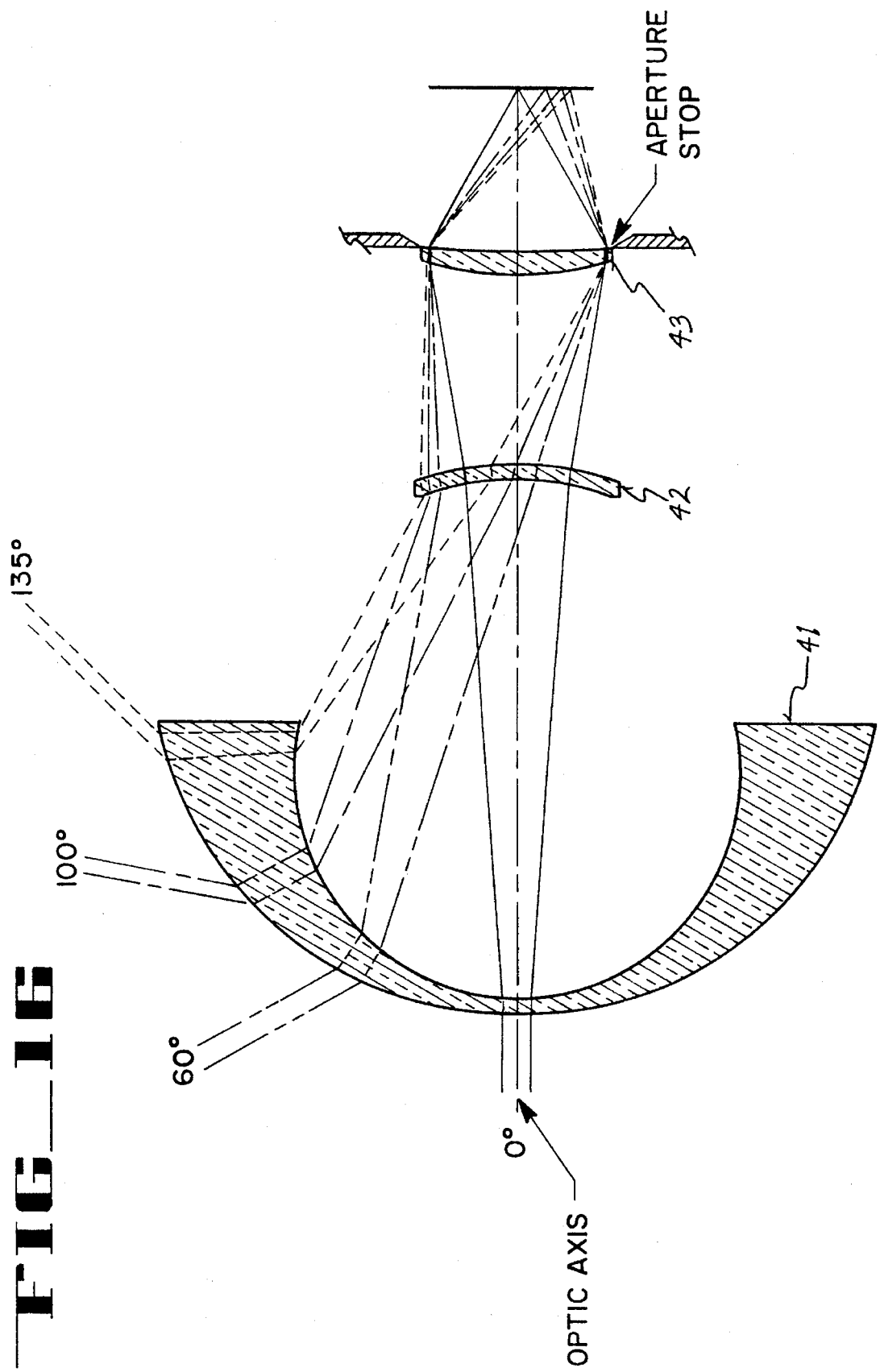

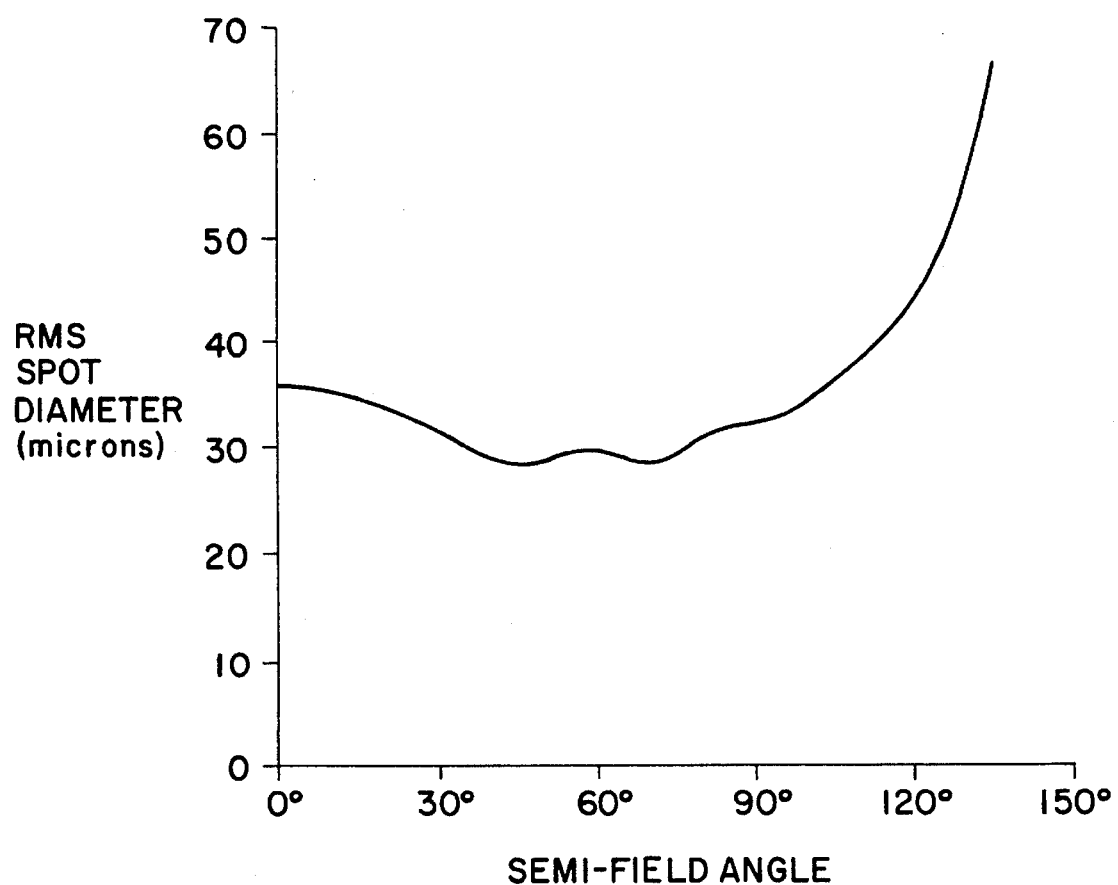
FIG_17

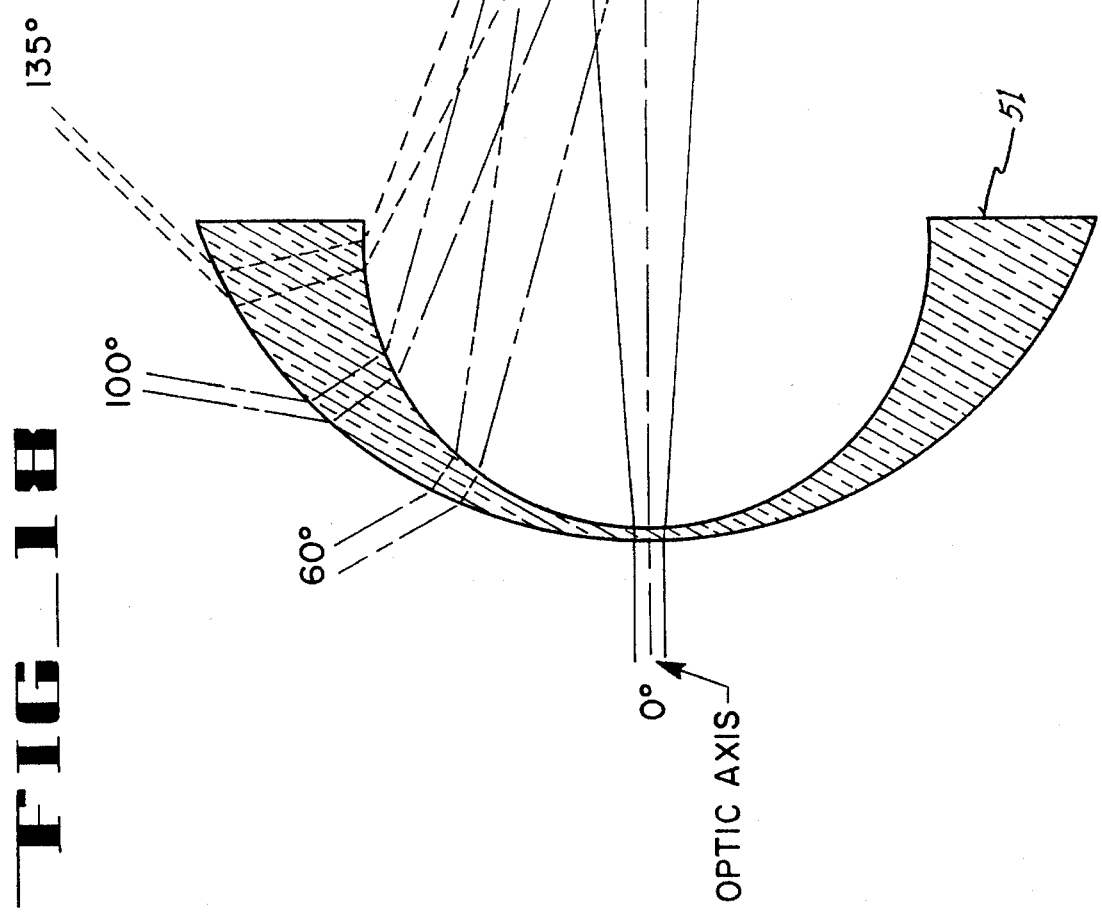
FIG_1H

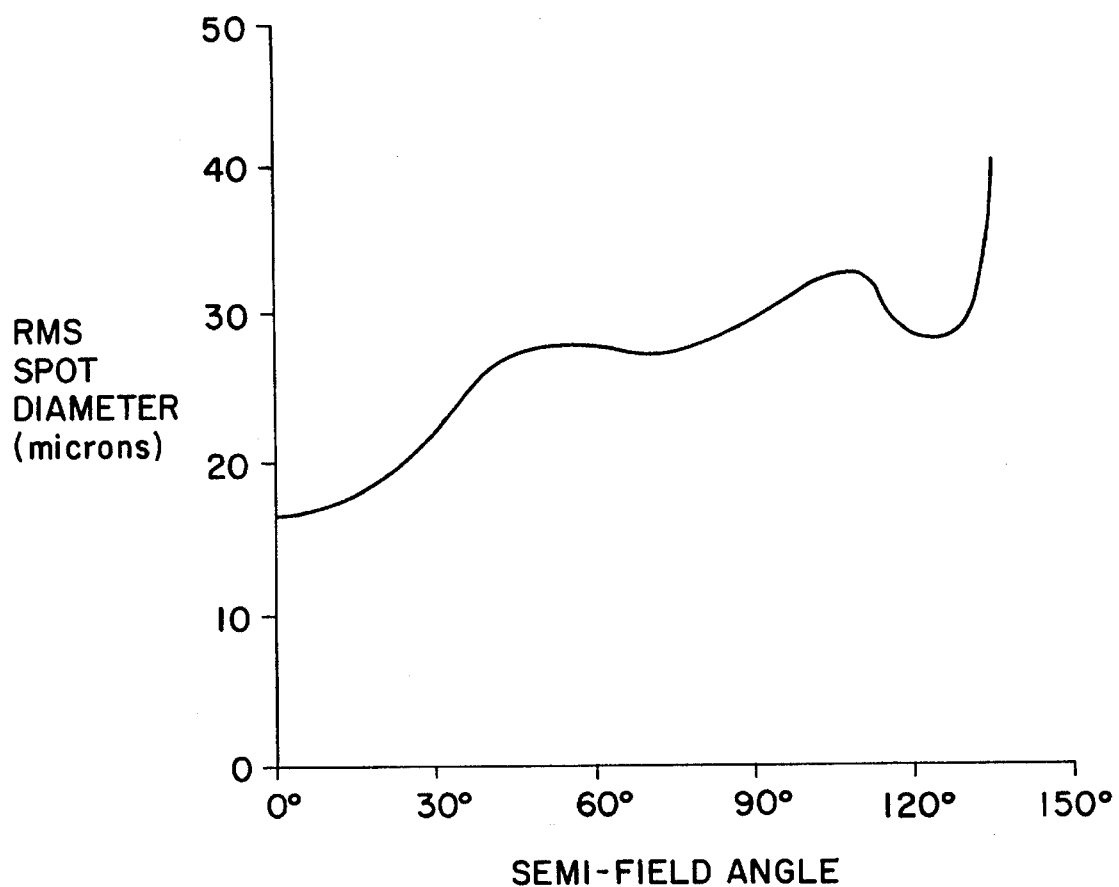
FIG_19

WIDE-APERTURE INFRARED LENSES WITH HYPER-HEMISPHERICAL FIELDS OF VIEW

TECHNICAL FIELD

This invention pertains generally to optical imaging systems, and more particularly to infrared lens systems capable of forming images of objects located within extremely wide fields of view (e.g., hemispherical and greater), which operate at wide relative aperture and with a limiting aperture stop in the final converging image space, to provide images in which an acceptable approximation of true perspective is preserved.

BACKGROUND ART

In a typical optical imaging system, the scene or object to be imaged is located in front of the optical elements comprising the system; and the image is formed on a focal surface (typically a planar surface) located to the rear of the optical elements comprising the system. However, in some so-called "fish-eye" lens systems, a portion of the scene to be imaged can be located to the rear of the optical elements that comprise the system. Such a "fish-eye" lens system can be said to "look behind" the optical elements that comprise the system—i.e., the optical elements of the system can accept radiation from angles greater than a complete hemisphere.

For an imaging lens system to preserve true perspective, the image size must be proportional to the tangent of the field angle. Consequently, to preserve true perspective for a semi-field angle greater than 90°, the image size would be infinite. However, in many imaging applications requiring a wide field angle, a certain amount of image distortion is appropriate in order to accommodate an image plane of reasonable size. In practice, a condition in which the image size is proportional to the field angle itself (rather than to the tangent of the field angle) is deemed to provide an acceptable angular representation of the image—i.e., to substantially preserve angular perspective. This condition is called the f-θ condition, and is deemed to preserve an acceptable approximation of true perspective.

Until the present invention, design forms had not been developed for "fish-eye" lens systems capable of accepting infrared radiation from hyper-hemispherical fields of view (i.e., from field angles approaching 270°, which is three-quarters of a complete sphere surrounding the entrance aperture) at wide relative apertures (i.e., greater than about f/2) to form images that substantially meet the f-θ condition.

SUMMARY OF THE INVENTION

It is an object of the present invention to provide design forms for infrared imaging systems that can operate at hyper-hemispherical fields of view and at wide relative apertures to produce images that are not less than 20% smaller in size than images corresponding to the f-θ condition.

It is a particular object of the present invention to provide design forms for infrared imaging systems that operate at hyper-hemispherical fields of view and at relative apertures approaching f/0.7, which have an image distortion that is not substantially greater than the image distortion associated with the f-θ condition.

It is also an object of the present invention to provide design forms for infrared imaging systems capable of operating at hyper-hemispherical fields of view and wide relative apertures, where each design form is characterized by:

a) a front steeply curved meniscus lens, which greatly reduces ray angles from any object located at a large angle with respect to the optic axis of the imaging system, and which functions to form a virtual image of such an object;

b) a rear converging lens group disposed coaxially with respect to the front meniscus lens, which relays the virtual image so as to form a real image on a focal plane; and c) an intermediate lens group of low converging or diverging power, which is located coaxially between the front meniscus lens and the rear converging lens group so as to coact with the front meniscus lens and the rear converging lens group to provide substantial correction of the imaging system for geometrical aberrations.

The scale of an imaging system designed in accordance with the present invention is proportional to the dimensions of an infrared detector positioned at the focal plane. Accordingly, the design forms disclosed herein have a scale that is compatible with the use of flat semiconductor array detectors of currently available size.

DESCRIPTION OF THE DRAWING

FIG. 1 is a profile drawing of a first embodiment of an infrared imaging system according to the present invention.

FIG. 2 provides a graphical representation of the variation of wave aberration with respect to normalized aperture height in the tangential and sagittal planes for three infrared wavelengths (viz., 8.0 microns, 10.0 microns and 12.0 microns) for the imaging system of FIG. 1 at a semi-field angle of 135°.

FIG. 3 provides a graphical representation of the variation of wave aberration with respect to normalized aperture height in the tangential and sagittal planes for three infrared wavelengths (viz., 8.0 microns, 10.0 microns and 12.0 microns) for the imaging system of FIG. 1 at a semi-field angle of 100°.

FIG. 4 provides a graphical representation of the variation of wave aberration with respect to normalized aperture height in the tangential and sagittal planes for three infrared wavelengths (viz., 8.0 microns, 10.0 microns and 12.0 microns) for the imaging system of FIG. 1 at a semi-field angle of 60°.

FIG. 5 provides a graphical representation of the variation of wave aberration with respect to normalized aperture height in the tangential and sagittal planes for three infrared wavelengths (viz., 8.0 microns, 10.0 microns and 12.0 microns) for the imaging system of FIG. 1 at a semi-field angle of 0°.

FIG. 6 provides a graphical representation of the variation of root-mean-square (RMS) spot diameter with respect to semi-field angle, where the RMS spot diameter is averaged with respect to three infrared wavelengths (viz., 8.0 microns, 10.0 microns and 12.0 microns) for the imaging system of FIG. 1.

FIG. 7 provides a graphical representation of:

a) the actual variation of semi-image height with respect to semi-field angle;

b) the variation of semi-image height with respect to semi-field angle that would be achieved, if the f-θ condition were met; and c) the variation of semi-image height with respect to semi-field angle that would occur, if the true-perspective condition (i.e., the f-tan θ condition) could be met;

at a wavelength of 10.0 microns for the imaging system of FIG. 1.

FIG. 8 is a profile drawing of a second embodiment of an infrared imaging system according to the present invention.

FIG. 9 provides a graphical representation of the variation of transverse ray aberration with respect to normalized aperture height in the tangential and sagittal planes for three infrared wavelengths (viz., 3.5 microns, 4.0 microns and 5.0 microns) for the imaging system of FIG. 8 at a semi-field angle of 135°.

FIG. 10 provides a graphical representation of the variation of transverse ray aberration with respect to normalized aperture height in the tangential and sagittal planes for three infrared wavelengths (viz., 3.5 microns, 4.0 microns and 5.0 microns) for the imaging system of FIG. 8 at a semi-field angle of 100°.

FIG. 11 provides a graphical representation of the variation of transverse ray aberration with respect to normalized aperture height in the tangential and sagittal planes for three infrared wavelengths (viz., 3.5 microns, 4.0 microns and 5.0 microns) for the imaging system of FIG. 8 at semi-field angle of 60°.

FIG. 12 provides a graphical representation of the variation of transverse ray aberration with respect to normalized aperture height in the tangential and sagittal planes for three infrared wavelengths (viz., 3.5 microns, 4.0 microns and 5.0 microns) for the imaging system of FIG. 8 at a semi-field angle of 0°.

FIG. 13 provides a graphical representation of the variation of root-mean-square (RMS) spot diameter with respect to semi-field angle, where the RMS spot diameter is averaged with respect to three infrared wavelengths (viz., 3.5 microns, 4.0 microns and 5.0 microns) for the imaging system of FIG. 8.

FIG. 14 is a profile drawing of a third embodiment of an infrared imaging system according to the present invention.

FIG. 15 provides a graphical representation of the variation of root-mean-square (RMS) spot diameter with respect to semi-field angle, where the RMS spot diameter is averaged with respect to three infrared wavelengths (viz., 8.0 microns, 10.0 microns and 12.0 microns) for the imaging system of FIG. 14.

FIG. 16 is a profile drawing of a fourth embodiment of an infrared imaging system according to the present invention.

FIG. 17 provides a graphical representation of the variation of root-mean-square (RMS) spot diameter with respect to semi-field angle, where the RMS spot diameter is averaged with respect to three infrared wavelengths ( viz., 8.0 microns, 10.0 microns and 12.0 microns) for the imaging system of FIG. 16.

FIG. 18 is a profile drawing of a fifth embodiment of an infrared imaging system according to the present invention.

FIG. 19 provides a graphical representation of the variation of root-mean-square (RMS) spot diameter with respect to semi-field angle, where the RMS spot diameter is averaged with respect to three infrared wavelengths (viz., 8.0 microns, 10.0 microns and 12.0 microns) for the imaging system of FIG. 18.

BEST MODE OF CARRYING OUT THE INVENTION

In FIG. 1, an imaging lens system according to a first embodiment of the present invention is illustrated, which has a field of view of 270° (i.e., a semi-field angle of 135°) and a relative aperture of f/1. The field of view is extraordinarily wide, comprising three-quarters of the entire three-dimensional space surrounding the imaging system. The imaging system of FIG. 1 provides good correction for geometrical aberrations over an infrared wavelength range from 8.0 microns to 12.0 microns.

The imaging lens system of FIG. 1 comprises four lens elements 11, 12, 13 and 14, all of which are made of germanium. The lens elements 11, 12, 13 and 14 are configured and coaxially positioned with respect to each other along an optic axis according to an optical prescription, which is specified in tabular format as follows:

TABLE I

| Surface No. | Radius (mm) | Thickness (mm) | Material |
|---|---|---|---|
| 1 | 42.777 | 1.305 | Germanium |
| 2 | 25.969 | 63.514 | |
| 3 | −34.170 | 1.566 | Germanium |
| | Conic constant: 3.326 | | |
| 4 | −41.214 | 21.080 | |
| 5 | −48.139 | 1.827 | Germanium |
| 6 | −36.454 | 0.052 | |
| 7 | 24.532 | 1.827 | Germanium |
| 8 | 35.388 | 3.654 | |
| Aperture stop | ∞ | 15.249 | |
| Image plane | ∞ | | | where the surfaces of the lens elements are numbered consecutively from left to right along the optic axis in accordance with optical design convention. Thus, surfaces No. 1 and No. 2 are the left and right surfaces, respectively, of the lens element 11. Similarly, surfaces No. 3 and No. 4 are the left and right surfaces, respectively, of the lens element 12; surfaces No. 5 and No. 6 are the left and right surfaces, respectively, of the lens element 13; and surfaces No. 7 and No. 8 are the left and right surfaces, respectively, of the lens element 14.

The radius listed in the second column for each of the lens surfaces in Table I is the radius of curvature (expressed in millimeters). All of the lens surfaces are spherical except for surface No. 3 (i.e., the left surface of the lens element 12), which is a conic surface with a conic constant of 3.326. The conic nature of surface No. 3 greatly facilitates correction of the imaging system of FIG. 1 for spherical aberration. In accordance with optical design convention, the radius of curvature of a specified lens surface is positive if the center of curvature of the surface lies to the right of the surface, and negative if the center of curvature of the surface lies to the left of the surface.

The thickness listed in the third column for each of the lens surfaces in Table I is the axial thickness (expressed in millimeters) of the lens element bounded on the left by the specified surface, or the axial separation (i.e., the air gap) between the specified surface and the next adjacent lens element to the right of the specified surface. The scale of the imaging system illustrated in FIG. 1 has been chosen to produce an image size of 12.8 mm diameter in order to be compatible with a typical semiconductor array detector element size of 50 microns.

Also illustrated in FIG. 1 are four pairs of rays passing through the lens system—i.e., a pair of rays corresponding to each of four different semi-field angles, viz., 0°, 60°, 100° and 135°. The aperture stop is shown in the converging image space of the lens system; and each of the four pairs of rays is shown being focussed to a corresponding image point on the image plane.

A graphical indication of the performance of an optical system at a given wavelength for a specified semi-field angle can be provided by plotting wave aberration (in terms of wavelength) for the system as a function of normalized aperture height in the tangential and sagittal planes at the given wavelength for the specified semi-field angle. In FIG. 2, plots of wave aberration versus normalized aperture height are provided at each of three different infrared wavelengths (viz., 8.0 microns, 10.0 microns and 12.0 microns) for rays entering the lens system of FIG. 1 at a semi-field angle of 135° (i.e., a full field angle of 270°).

In FIG. 3, plots of wave aberration versus normalized aperture height are provided at the infrared wavelengths 8.0 microns, 10.0 microns and 12.0 microns for rays entering the lens system of FIG. 1 at a semi-field angle of 100° (i.e., a full field angle of 200°).

In FIG. 4, plots of wave aberration versus normalized aperture height are provided at the infrared wavelengths 8.0 microns, 10.0 microns and 12.0 microns for rays entering the lens system of FIG. 1 at a semi-field angle of 60° (i.e., a full field angle of 120°).

In FIG. 5, plots of wave aberration versus normalized aperture height are provided at the infrared wavelengths 8.0 microns, 10.0 microns and 12.0 microns for rays entering the lens system of FIG. 1 along the optic axis (i.e., at a semi-field angle of 0°).

From the plots shown in FIGS. 2, 3, 4 and 5, it is evident that the lens system illustrated in FIG. 1 is well-corrected for geometrical aberrations. At a semi-field angle of 0° (i.e., along the optic axis), the maximum wave aberration over the entrance aperture varies within a narrow range from 0.03 wave to 0.28 wave over the entire wavelength range from 8.0 microns to 12.0 microns, which indicates a high degree of correction for geometrical aberrations. The same high degree of correction for geometrical aberrations is maintained as the field angle is increased through a wide range— because significant increases in the value of the maximum wave aberration over the entrance aperture occur only when the semi-field angle becomes greater than about 90° (i.e., only when the field angle is greater than a complete hemisphere).

The root-mean-square (RMS) spot diameter for rays of a specified wavelength focussed onto the image plane of an optical imaging system provides a measure of the performance of the imaging system at the specified wavelength. In FIG. 6, the RMS spot diameter (measured in microns) is plotted as a function of semi-field angle for the lens system of FIG. 1, where the RMS spot diameter is averaged with respect to the wavelengths 8.0 microns, 10.0 microns and 12.0 microns.

It is apparent from FIG. 6 that at semi-field angles less than 60°, the RMS spot diameter remains substantially invariant with respect to field angle (i.e., changing by only about 1.8 microns, from about 8.2 microns to about 10.0 microns, over the semi-field angular range from 10° to 60°). At semi-field angles greater than 60°, the RMS spot diameter increases approximately linearly with respect to field angle to reach a value of about 40 microns at a semi-field angle of 135°.

If an imaging system is to preserve true perspective, the image size must be proportional to the tangent of the field angle, which is a condition that is called the f-tan θ condition. Thus, for a field angle of 180° (i.e., a semi-field angle of 90°), the image size would have to be infinitely large in order to preserve true perspective. For field angles greater than 180°, the f-tan θ condition is meaningless because the image size predicted by the f-tan θ condition would then be negative. However, for applications involving wide field angles, especially for field angles greater than 180°, the amount of image distortion that results when the image size is proportional to the field angle itself (rather than to the tangent of the field angle) is usually quite acceptable. The condition in which the image size is proportional to the field angle itself is called the f-θ condition. When the f-θ condition obtains, angular perspective is deemed to be preserved.

In FIG. 7, the actual variation of semi-image height (i.e., half the actual image height) expressed in millimeters as a function of semi-field angle for a wavelength of 10.0 microns is plotted as a broken-line curve for the lens system of FIG. 1. The variation of semi-image height with respect to semi-field angle that would characterize the lens system of FIG. 1, if the f-θ condition were met, is shown in FIG. 7 as a solid-line curve. The variation of semi-image height with respect to semi-field angle that would characterize the lens system of FIG. 1, if the f-tan θ condition (i.e., the "true-perspective" condition) were met, is shown as a dashed-line curve in FIG. 7.

It is apparent from FIG. 7 that for semi-field angles up to about 30° (i.e., field angles up to about 60°), the actual size of the image produced by the lens system of FIG. 1 is practically indistinguishable from the image size that would be produced if the f-θ condition were met. It is also apparent from FIG. 7 that for field angles up to about 30°, the actual size of the image produced by the lens system of FIG. 1 is substantially the same as the image size that would be predicted by the f-tan θ condition (i.e., the true-perspective condition). For semi-field angles greater than 30°, the image size predicted by the f-tan θ condition becomes increasingly large—and becomes impractically large as the semi-field angle approaches 90°.

For semi-field angles greater than 90°, the f-tan θ condition is meaningless, but the f-θ condition is valid and provides a reasonable mapping of a distant object onto the image plane. The closeness of the broken-line curve to the solid-line curve in FIG. 7 indicates that the amount of image distortion actually produced by the lens system of FIG. 1 is not significantly different from the amount of image distortion that would be produced if the f-θ condition were met, and hence could be readily tolerated in many applications.

In FIG. 8, an imaging lens system according to a second embodiment of the present invention is illustrated, which has a field of view of 270° and a relative aperture of f/1, and which provides good correction for geometrical aberrations over an infrared wavelength range from 3.5 microns to 5.0 microns. The imaging lens system of FIG. 8 comprises four lens elements 21, 22, 23 and 24, all of which are made of silicon—which exhibits only a very small spectral variation of refractive index over this wavelength range. All of the lens surfaces are spherical, except for surface No. 3 (i.e., the left surface of the lens element 22), which is a conic surface with a conic constant of 4.856 The lens elements 21, 22, 23 and 24 are configured and coaxially positioned with respect to each other along an optic axis according to an optical prescription, which is specified in tabular format as follows:

TABLE II

| Surface No. | Radius (mm) | Thickness (mm) | Material |
|---|---|---|---|
| 1 | 54.502 | 1.376 | Silicon |
| 2 | 29.981 | 74.757 | |
| 3 | −37.647 | 1.651 | Silicon |
| | Conic constant: 4.856 | | |
| 4 | −46.232 | 20.952 | |
| 5 | −53.021 | 1.926 | Silicon |
| 6 | −35.011 | 0.055 | |
| 7 | 21.091 | 1.926 | Silicon |
| 8 | 30.014 | 3.963 | |

TABLE II-continued

| Surface No. | Radius (mm) | Thickness (mm) | Material |
| --- | --- | --- | --- |
| Aperture stop | ∞ | 13.999 | |
| Image plane | ∞ | | | where the surfaces of the lens elements are numbered consecutively from left to right along the optic axis in accordance with optical design convention as discussed above in connection with Table I.

In FIG. 9, plots of transverse ray aberration versus normalized aperture height are provided at each of three different infrared wavelengths (viz., 3.5 microns, 4.0 microns and 5.0 microns) for rays entering the lens system of FIG. 8 at a semi-field angle of 135° (i.e., a full field angle of 270°).

In FIG. 10, plots of transverse ray aberration versus normalized aperture height are provided at each of three different infrared wavelengths (viz., 3.5 microns, 4.0 microns and 5.0 microns) for rays entering the lens system of FIG. 8 at a semi-field angle of 100° (i.e., a full field angle of 200°).

In FIG. 11, plots of transverse ray aberration versus normalized aperture height are provided at each of three different infrared wavelengths (viz., 3.5 microns, 4.0 microns and 5.0 microns) for rays entering the lens system of FIG. 8 at a semi-field angle of 60° (i.e., a full field angle of 120°).

In FIG. 12, plots of transverse ray aberration versus normalized aperture height are provided at the wavelengths 3.5 microns, 4.0 microns and 5.0 microns for rays entering the lens system of FIG. 8 along the optic axis (i.e., at a field angle of 0°).

From the plots shown in FIGS. 9, 10, 11 and 12, it is evident that the lens system illustrated in FIG. 8 is well-corrected for geometrical aberrations. At a semi-field angle of 0° (i.e., along the optic axis), the maximum transverse ray aberration over the entrance aperture varies within a narrow range from 0.007 mm to 0.025 mm over the entire wavelength range from 3.5 microns to 5.0 microns, which indicates a high degree of correction for geometrical aberrations. The same high degree of correction for geometrical aberrations is maintained at wide field angles, because the transverse ray aberrations increase significantly only at semi-field angles greater than 90° (i.e., at field angles greater than a complete hemisphere).

In FIG. 13, the RMS spot diameter (measured in microns) is plotted as a function of semi-field angle for the lens system of FIG. 8, where the RMS spot diameter is averaged with respect to the wavelengths 3.5 microns, 4.0 microns and 5.0 microns.

It is apparent from FIG. 13 that at semi-field angles less than 90°, the RMS spot diameter remains substantially invariant with respect to field angle—i.e., changing by only about 6 microns from about 19 microns to about 24 microns) over the semi-field angular range from 0° to 90°, which is a complete hemisphere. At field angles greater than a complete hemisphere (i.e., semi-field angles greater than 90°), the RMS spot diameter increases approximately linearly with respect to field angle to reach a value of about 35 microns at a semi-field angle of 135°.

In FIG. 14, an imaging lens system according to a third embodiment of the present invention is illustrated, which has a field of view of 270° and a wider relative aperture of f/0.7, and which provides good correction for geometrical aberrations over an infrared wavelength range from 8.0 microns to 12.0 microns. The imaging lens system of FIG. 8 comprises four lens elements 31, 32, 33 and 34, all of which are made of germanium. The lens elements 31, 32, 33 and 34 are configured and coaxially positioned with respect to each other along an optic axis according to an optical prescription, which is specified in tabular format as follows:

TABLE III

| Surface No. | Radius (mm) | Thickness (mm) | Material |
| --- | --- | --- | --- |
| 1 | 50.628 | 1.293 | Germanium |
| 2 | 31.121 | 76.230 | |
| 3 | −40.185 | 1.551 | Germanium |
| Conic constant: 4.800 $A = -0.1390 \times 10^{-5}$; $B = -0.1176 \times 10^{-7}$; $C = 0.4306 \times 10^{-11}$; $D = -0.4016 \times 10^{-12}$ | | | |
| 4 | −57.404 | 22.297 | |
| 5 | −50.165 | 3.619 | Germanium |
| 6 | −36.707 | 0.100 | |
| 7 | 23.436 | 3.102 | Germanium |
| 8 | 28.696 | 4.083 | |
| Aperture stop | ∞ | 16.287 | |
| Image plane | ∞ | | | where the surfaces of the lens elements are numbered consecutively from left to right along the optic axis in accordance with-optical design convention as discussed above in connection with Table I. All of the lens surfaces are spherical except for surface No. 3, (i.e., the left surface of the lens element 32), which is aspheric. It is noted that in each of the embodiments illustrated in FIGS. 1 and 8, the corresponding surface No. 3 was a simple conic surface. However, in the embodiment of FIG. 14, surface No. 3 is a general aspheric surface defined by the conic constant 4.800 and the four coefficients A, B, C and D listed in Table III.

In FIG. 15, the RMS spot diameter (measured in microns) for the lens system of FIG. 14—where the RMS spot diameter is averaged with respect to the three wavelengths 8.0 microns, 10.0 microns and 12.0 microns—is plotted as a function of semi-field angle. It is apparent from FIG. 15 that at semi-field angles less than 90°, the RMS spot diameter remains substantially invariant with respect to field angle—i.e., changing by only about 4 microns (from about 29 microns to about 32 microns) over a complete hemisphere. At field angles beyond a complete hemisphere, the RMS spot diameter for the lens system of FIG. 14 increases rapidly with respect to field angle to reach a value of about 64 microns at a semi-field angle of 135°.

In FIG. 16, an imaging lens system according to a fourth embodiment of the present invention is illustrated, which has a field of view of 270° and a relative aperture of f/1, and which provides good correction for geometrical aberrations over an infrared wavelength range extending from 8.0 microns to 12.0 microns. The imaging lens system of FIG. 16 comprises three lens elements 41, 42 and 43, all of which are made of germanium.

The lens elements 41, 42 and 43 of the lens system shown in FIG. 16 are configured and coaxially positioned with respect to each other along an optic axis according to an optical prescription, which is specified in tabular format as follows:

TABLE IV

| Surface No. | Radius (mm) | Thickness (mm) | Material |
| --- | --- | --- | --- |
| 1 | 42.215 | 1.304 | Germanium |
| 2 | 25.774 | 62.415 | |
| 3 | −28.977 | 1.565 | Germanium |

TABLE IV-continued

| Surface No. | Radius (mm) | Thickness (mm) | Material |
|---|---|---|---|
| | Conic constant: 1.566 | | |
| | A = −0.5486 × 10⁻⁶; B = −0.1148 × 10⁻⁷; | | |
| | C = −0.3718 × 10⁻¹¹; D = 0.2724 × 10⁻¹² | | |
| 4 | −34.334 | 22.119 | |
| 5 | 37.056 | 2.658 | Germanium |
| 6 | 197.417 | 3.651 | |
| | Conic constant: 104.771 | | |
| | A = 0.3673 × 10⁻⁵; B = −0.1931 × 10⁻⁷; | | |
| | C = 0.1195 × 10⁻⁹; D = −0.3890 × 10⁻¹² | | |
| Aperture stop | ∞ | 14.967 | |
| Image plane | ∞ | | |

<br/>

Table IV row values (corrected with LaTeX):

| Surface No. | Radius (mm) | Thickness (mm) | Material |
|---|---|---|---|
| | Conic constant: 1.566 | | |
| | $A = -0.5486 \times 10^{-6}$; $B = -0.1148 \times 10^{-7}$; | | |
| | $C = -0.3718 \times 10^{-11}$; $D = 0.2724 \times 10^{-12}$ | | |
| 4 | −34.334 | 22.119 | |
| 5 | 37.056 | 2.658 | Germanium |
| 6 | 197.417 | 3.651 | |
| | Conic constant: 104.771 | | |
| | $A = 0.3673 \times 10^{-5}$; $B = -0.1931 \times 10^{-7}$; | | |
| | $C = 0.1195 \times 10^{-9}$; $D = -0.3890 \times 10^{-12}$ | | |
| Aperture stop | ∞ | 14.967 | |
| Image plane | ∞ | | | where the surfaces of the lens elements are numbered consecutively from left to right along the optic axis in accordance with optical design convention as discussed above in connection with Table I. All of the lens surfaces shown in FIG. 16 are spherical except for surface No. 3 (i.e., the left surface of the lens element 42) and surface No. 6 (i.e., the right surface of the lens element 43), which are both of general aspheric shape, Surface No. 3 and surface No. 6 are defined by the conic constants and coefficients listed therefor in Table IV.

In FIG. 17, the RMS spot diameter (measured in microns) is plotted as a function of semi-field angle for the lens system of FIG. 16, where the RMS spot diameter is averaged with respect to the three infrared wavelengths 8.0 microns, 10.0 microns and 12.0 microns. It is apparent from FIG. 17 that at semi-field angles less than 110°, the RMS spot diameter remains substantially invariant—i.e., changing by only about 3 microns (from about 35 microns at 0° to about 38 microns at 110°). Beyond 110°, the RMS spot diameter changes rapidly with semi-field angle reaching 66 microns at 135°.

In FIG. 18, an imaging lens system according to a fifth embodiment of the present invention is illustrated, which has a field of view of 270° and a relative aperture of f/1, and which provides good correction for geometrical aberrations over an infrared wavelength range from 8.0 microns to 12.0 microns. The imaging lens system of FIG. 18 comprises five lens elements 51, 57, 53, 54 and 55, all of which have spherical surfaces and are made of germanium. The lens elements 51, 57, 53, 54 and 55 are configured and coaxially positioned with respect to each other along an optic axis according to an optical prescription, which is specified in tabular format as follows:

TABLE V

| Surface No. | Radius (mm) | Thickness (mm) | Material |
|---|---|---|---|
| 1 | 48.513 | 1.403 | Germanium |
| 2 | 28.536 | 73.303 | |
| 3 | 247.086 | 1.684 | Germanium |
| 4 | −333.311 | 2.987 | |
| 5 | −25.535 | 1.684 | Germanium |
| 6 | −36.016 | 23.728 | |
| 7 | −1269.995 | 1.964 | Germanium |
| 8 | −100.611 | 0.056 | |
| 9 | 21.206 | 1.964 | Germanium |
| 10 | 25.320 | 3.384 | |
| Aperture stop | ∞ | 16.286 | |
| Image plane | ∞ | | | where the surfaces of the lens elements are numbered consecutively from left to right along the optic axis in accordance with optical design convention as discussed above in connection with Table I.

In FIG. 19, the RMS spot diameter (measured in microns) is plotted as a function of semi-field angle for the lens system of FIG. 18, where the RMS spot diameter is averaged with respect to the three infrared wavelengths 8.0 microns, 10.0 microns and 12.0 microns. It is apparent from FIG. 19 that the RMS spot diameter increases from about 16 microns to about 27 microns over the semi-field angular range from 0° to 45°. At semi-field angles within the range from 45° to 120°, the RMS spot diameter remains substantially invariant—i.e., changing by only about 4 microns (from about 28 microns at 45° to about 32 microns at 120°). The RMS spot diameter as a function of semi-field angle changes rapidly over the semi-field angular range from 110° to 135°.

The various measures of image quality described above for the lens systems illustrated in FIGS. 1, 8, 14, 16 and 18 are dependent upon the index of refraction of the lens elements of the particular lens system. However, index of refraction generally varies with wavelength. Thus, the variation of index of refraction for germanium over the wavelength range from 8.0 microns to 12.0 microns (i.e., the operational range for the lens systems illustrated in FIGS. 1, 14, 16 and 18) is indicated as follows:

TABLE VI

| Material | Wavelength (microns) | | |
|---|---|---|---|
| | 8.0μ | 10.0μ | 12.0μ |
| Germanium | 4.005260 | 4.003073 | 4.002073 | and the variation of index of refraction for silicon over the wavelength range from 3.5 microns to 5.0 microns (i.e., the operational range for the lens systems illustrated in FIG. 8) is indicated as follows:

TABLE VII

| Material | Wavelength (microns) | | |
|---|---|---|---|
| | 3.5μ | 4.0μ | 5.0μ |
| Silicon | 3.428117 | 3.425406 | 3.422272 |

It is apparent from Tables VI and VII that the index of refraction for germanium varies only in the third decimal place over the wavelength range from 8.0 microns to 12.0 microns, and that the index of refraction for silicon varies only in the third decimal place over the wavelength range from 3.5 to 5.0 microns. Consequently, the measures of image quality described above for the lens systems illustrated in FIGS. 1, 8, 14, 16 and 18 are valid over the indicated operational wavelength ranges.

The present invention has been described above in terms of specific design forms that were developed for particular applications. However, variations on the above-described design forms, as optimized for use in other applications, would become apparent to practitioners skilled in the art of optical design upon perusal of the foregoing specification and accompanying drawing, and hence would be within the scope of the present invention. Accordingly, the present invention as described herein is defined more generally by the following claims and their equivalents.

I claim:

1. An optical system for forming an infrared image of a distant scene on a focal surface, said distant scene subtending a solid angle greater than $2\pi$ steradians about an optic axis normal to said focal surface, said optical system comprising a plurality of lens elements disposed coaxially along said optic axis, said lens elements coacting with each other to achieve substantial correction of said optical system for geometrical aberrations, wherein said lens elements form an image of said distant scene, where said scene subtends a solid angle of about 270°.

2. An optical system for forming an infrared image of a distant scene on a focal surface, said distant scene subtending a solid angle greater than $2\pi$ steradians about an optic axis normal to said focal surface, said optical system comprising a plurality of lens elements disposed coaxially along said optic axis, said lens elements coacting with each other to achieve substantial correction of said optical system for geometrical aberrations, comprising lens elements that are configured and positioned with respect to each other along said optic axis substantially according to a design form specified as follows:

| Surface No. | Radius (mm) | Thickness (mm) | Material |
|---|---|---|---|
| 1 | 42.78 | 1.31 | Germanium |
| 2 | 25.97 | 63.51 | |
| 3 | −34.17 | 1.57 | Geranium |
| Conic constant: 3.326 | | | |
| 4 | −41.21 | 21.08 | |
| 5 | −48.14 | 1.83 | Geranium |
| 6 | −36.45 | 0.05 | |
| 7 | 24.53 | 1.83 | Germanium |
| 8 | 35.39 | 3.65 | |
| Aperture stop | ∞ | 15.25 | |
| Image plane | ∞ | | | where the surfaces of the lens elements are numbered consecutively from left to right along the optic axis.

3. An optical system for forming an infrared image of a distant scene on a focal surface, said distant scene subtending a solid angle greater than $2\pi$ steradians about an optic axis normal to said focal surface, said optical system comprising a plurality of lens elements disposed coaxially along said optic axis, said lens elements coacting with each other to achieve substantial correction of said optical system for geometrical aberrations, comprising lens elements that are configured and positioned with respect to each other along said optic axis substantially according to a design form specified as follows:

| Surface No. | Radius (mm) | Thickness (mm) | Material |
|---|---|---|---|
| 1 | 54.50 | 1.38 | Silicon |
| 2 | 29.98 | 74.76 | |
| 3 | −37.65 | 1.65 | Silicon |
| Conic constant: 4.856 | | | |
| 4 | −46.23 | 20.95 | |
| 5 | −53.02 | 1.93 | Silicon |
| 6 | −35.01 | 0.06 | |
| 7 | 21.09 | 1.93 | Silicon |
| 8 | 30.01 | 3.96 | |
| Aperture stop | ∞ | 14.00 | |
| Image plane | ∞ | | | where the surfaces of the lens elements are numbered consecutively from left to right along the optic axis.

4. An optical system for forming an infrared image of a distant scene on a focal surface, said distant scene subtending a solid angle greater than $2\pi$ steradians about an optic axis normal to said focal surface, said optical system comprising a plurality of lens elements disposed coaxially along said optic axis, said lens elements coacting with each other to achieve substantial correction of said optical system for geometrical aberrations, comprising lens elements that are configured and positioned with respect to each other along said optic axis substantially according to a design form specified as follows:

| Surface No. | Radius (mm) | Thickness (mm) | Material |
|---|---|---|---|
| 1 | 50.63 | 1.29 | Germanium |
| 2 | 31.12 | 76.23 | |
| 3 | −40.19 | 1.55 | Germanium |
| Conic constant: 4.800 | | | |
| $A = -0.1390 \times 10^{-5}$; $B = -0.1176 \times 10^{-7}$; | | | |
| $C = 0.4306 \times 10^{-11}$; $D = -0.4016 \times 10^{-12}$ | | | |
| 4 | −57.40 | 22.30 | |
| 5 | −50.17 | 3.62 | Germanium |
| 6 | −36.71 | 0.10 | |
| 7 | 23.44 | 3.10 | Germanium |
| 8 | 28.70 | 4.08 | |
| Aperture stop | ∞ | 16.29 | |
| Image plane | ∞ | | | where the surfaces of the lens elements are numbered consecutively from left to right along the optic axis.

5. An optical system for forming an infrared image of a distant scene on a focal surface, said distant scene subtending a solid angle greater than $2\pi$ steradians about an optic axis normal to said focal surface, said optical system comprising a plurality of lens elements disposed coaxially along said optic axis, said lens elements coacting with each other to achieve substantial correction of said optical system for geometrical aberrations comprising lens elements that are configured and positioned with respect to each other along said optic axis substantially according to a design form specified as follows:

| Surface No. | Radius (mm) | Thickness (mm) | Material |
|---|---|---|---|
| 1 | 42.22 | 1.30 | Germanium |
| 2 | 25.77 | 62.41 | |
| 3 | −28.98 | 1.57 | Germanium |
| Conic constant: 1.566 | | | |
| $A = -0.5486 \times 10^{-6}$; $B = -0.1148 \times 10^{-7}$; | | | |
| $C = -0.3718 \times 10^{-11}$; $D = 0.2724 \times 10^{-12}$ | | | |
| 4 | −34.33 | 22.12 | |
| 5 | 37.06 | 2.66 | Germanium |
| 6 | 197.42 | 3.65 | |
| Conic constant: 104.771 | | | |
| $A = 0.3673 \times 10^{-5}$; $B = -0.1931 \times 10^{-7}$; | | | |
| $C = 0.1195 \times 10^{-9}$; $D = -0.3890 \times 10^{-12}$ | | | |
| Aperture stop | ∞ | 14.97 | |
| Image plane | ∞ | | | where the surfaces of the lens elements are numbered consecutively from left to right along the optic axis.

6. An optical system for forming an infrared image of a distant scene on a focal surface, said distant scene subtending a solid angle greater than $2\pi$ steradians about an optic axis normal to said focal surface, said optical system comprising a plurality of lens elements disposed coaxially along said optic axis, said lens elements coacting with each other to achieve substantial correction of said optical system for geometrical aberrations, comprising lens elements that are configured and positioned with respect to each other along said optic axis substantially according to a design form specified as follows:

| Surface No. | Radius (mm) | Thickness (mm) | Material |
|---|---|---|---|
| 1 | 48.51 | 1.40 | Germanium |
| 2 | 28.54 | 73.30 | |

| Surface No. | Radius (mm) | Thickness (mm) | Material |
|---|---|---|---|
| 3 | 247.09 | 1.68 | Geranium |
| 4 | −333.31 | 2.99 | |
| 5 | −25.54 | 1.68 | Geranium |
| 6 | −36.02 | 23.73 | |
| 7 | −1270.00 | 1.96 | Germanium |
| 8 | −100.61 | 0.06 | |
| 9 | 21.21 | 1.96 | Germanium |
| 10 | 25.32 | 3.38 | |
| Aperture stop | ∞ | 16.29 | |
| Image plane | ∞ | | | where the surfaces of the lens elements are numbered consecutively from left to right along the optic axis.

* * * * *